June 29, 1965  B. D. SCHWALM  3,191,367
FORAGE HARVESTER
Filed Sept. 10, 1963
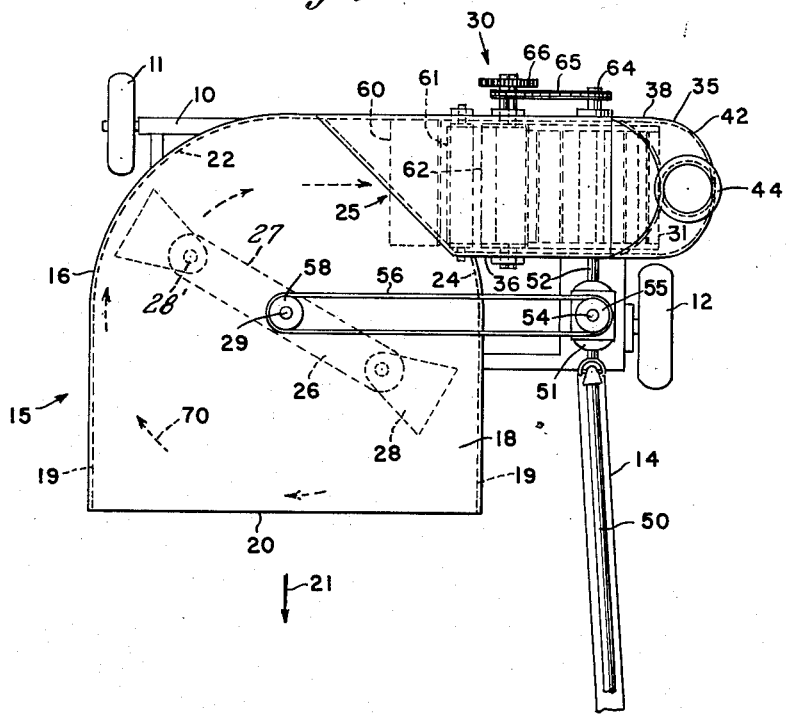
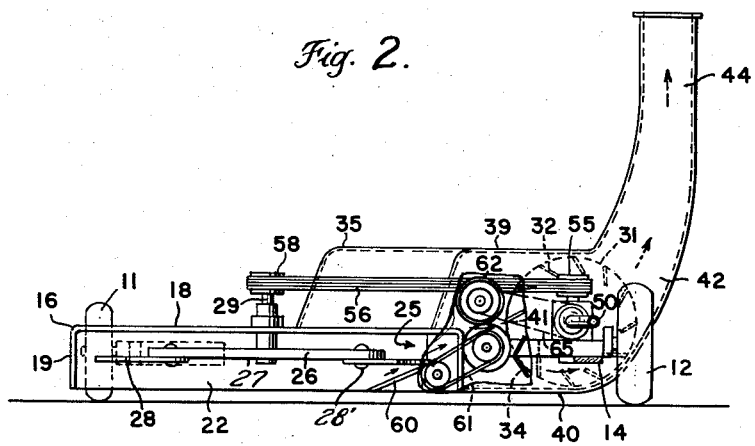
INVENTOR.
BRUCE D. SCHWALM
BY
ATTORNEY

United States Patent Office 3,191,367
Patented June 29, 1965

3,191,367
FORAGE HARVESTER
Bruce D. Schwalm, Leola, Pa., assignor to Sperry Rand Corporation, New Holland, Pa., a corporation of Delaware
Filed Sept. 10, 1963, Ser. No. 307,911
7 Claims. (Cl. 56—23)

This invention relates generally to forage harvesters and more particularly to machines for harvesting standing crop material other than row crops.

The flail type harvester has gained considerable acceptance in handling certain types of crops and conditions. The simplicity, versatility and endurance of such a machine appeals to many farmers. In a flail type harvester, there is a flail unit rotatable on a horizontal axis transverse to ground travel and operative to cut standing material. The cut material is thrown by the unit into a trough where an auger operates to convey the material to a combination cutter and blower unit where the material is cut further and discharged through a spout to a trailing wagon. Such a harvester is shown in U.S. Patent No. 2,990,667.

Generally, the product produced by a flail type harvester is non-uniform as to length of cut. Pieces of a wide variety of lengths are produced. If stored in a tower cylindrical silo, less material can be placed in the structure than when the material is uniformly and finely cut. This is because finely cut material packs better and provides a more solid mass. Also, long cut material is relatively difficult to gather with a silo unloader. Further, after the feed has been removed from the silo, it causes plugging problems in certain types of mechanical stock feeders.

In an attempt to get a more uniform product from a flail harvester, feed rolls have been provided on some machines to compress the material as it leaves the conveyor auger and enters the cutter and blower. Because of the random arrangement of the material coming from the auger, the feed rolls provide only limited improvement in length of cut.

One object of this invention is to provide a double cut forage harvester having a first cutter for severing standing crop material and delivering such cut material lengthwise into a second device which will chop the material into pieces of uniform size.

Another object of this invention is to provide a double cut forage harvester of the character described which delivers material in relatively long lengths into a chopper, such long lengths being controllable better by infeed rolls and thereby insuring more uniform, finer cutting.

A further object of this invention is to provide a double cut forage harvester of the character described which will be less costly to build than conventional type flail harvesters employing feed rolls to deliver material to a chopper-blower.

A still further object of this invention is to provide a double cut forage harvester which has a simplified drive, a simplified delivery of material from a first unit to a second, and a spout location which facilitates discharge of material into a trailing wagon.

Other objects of this invention will be apparent hereinafter from the specification and from the recital in the appended claims.

In the drawing:

FIG. 1 is a fragmentary, generally diagrammatic, plan view of a double cut forage harvester constructed according to this invention; and FIG. 2 is a front view of the harvester.

Referring now to the drawing by numerals of reference, 10 denotes a frame structure supported on laterally spaced ground wheels 11 and 12. A forwardly projecting tongue 14 is used to connect the frame to a tractor for towing the machine across a field.

Mounted on frame 10 is a rotary cutter 15. The cutter has a hood 16 consisting of a top wall 18 which extends horizontally and has side walls 19 depending therefrom. At its forward end 20, relative to ground travel indicated by the arrow 21, the hood 16 is opened to allow standing crop material to enter. The depending walls of the hood include a curved portion 22 and a relatively straight side portion 24 which define a discharge outlet 25.

Located inside of hood 16 and rotatable in a clockwise direction about a vertical axis (FIG. 1) is a cutter 26 having knife elements 28. The rotary cutter has a diameter which traverses a major portion of the inlet of hood 16, and the cutter is carried on a vertical shaft 29 located in the center of hood 16 and extending upwardly therefrom. The curved portion 22 of the hood is concentric to the cutter axis. The knife elements 28 are pivotally connected at 28' to radial arm 27 for swinging movement about axes parallel to shaft 29. A connection of the type employed is shown in Patent No. 2,953,887.

Also mounted on frame 10 is a reel type chopper 30 comprising a cutter head 31 rotatable about a fore-and-aft, horizontal axis. The cutter head has angularly spaced knives 32 which travel in a counterclockwise direction when viewed as shown in FIG. 2. The knives 32 are successively cooperative with a stationary shear bar 34 which extends parallel to the axis of rotation of the cutter head. The chopper has a housing 35 including transversely extending vertical walls, namely front wall 36 and rear wall 38, which are interconnected by a top wall 39 over cutter head 31 and a bottom wall 40 beneath it. These walls define an inlet opening 41 facing laterally in the direction of the discharge outlet 25 of the hood 16, and a discharge opening 42 through which chopped material passes to a vertically extending spout 44.

For driving cutter 15 and chopper 30, a power-take-off shaft 50 is provided which extends fore-and-aft and is connected at its forward end, not shown, to the output shaft of the tractor towing the implement. At its rearward end, shaft 50 is connected to a gearbox 51 carried on the frame 10. The gearbox has a straight through shaft 52 connected to the cutter head 31. Thus, a substantially straight-line drive transmission is provided to the chopper. Projecting upwardly of gearbox 51 is an output shaft 54 to a sheave 55 for drive belts 56. These belts extend transversely relative to the travel of the machine and they are connected to a sheave 58 mounted on the upper end of shaft 29 for cutter 26.

Interposed between discharge outlet 25 of hood 16 and the infeed opening 41 of housing 35 is guide and feed means in the form of an inclined guide plate 60 supported on hood 16 and extending beneath the plane of rotation of cutter 26, as shown in FIG. 2. The lower end of the plate 60 is closer to the ground than the upper end. Between the upper end of the inclined plate and the infeed opening 41 of the chopper is an inclined feed apron 61. At the upper discharge end of the apron a feed roll 62 is provided to compress the material on the apron as it travels toward cutter head 31. As shown in FIG. 1, the cutter head has a rearwardly projecting shaft 64 connected by a chain drive 65 to the feed roll 62. A gear drive 66 is provided from the feed roll to the feed apron 61.

Wheels 11 and 12 are mounted by conventional means to the harvester frame, and they are spaced within the lateral confines of the unit. Also, as shown in FIG. 1, wheel 12 is mounted forwardly of the chopper housing. With wheel 12 so arranged, it does not interfere with a wagon towed directly behind the harvester.

In operation, when the harvester travels forwardly in the direction of the arrow 21, standing crop material enters hood 16 where it is cut by the knives 28 of the rotary cutter 15. The rotation of the cutter in a clockwise direction when viewed as shown in FIG. 1 produces a discharge of material as indicated by the arrows 70 and through the outlet 25. The material is cast upon infeed apron 61 for conveyance under feed roll 62 and to the chopper where it is cut into uniform, fine pieces by knives 32 successively cooperative with shear bar 34. The chopped material is discharged through opening 42 and then through the spout 44 to a trailing wagon. The inclined guide plate 60 insures that the material is guided to the feed apron as it comes from the knives of the rotary cutter.

With this arrangement, the crop material is double cut. The rotary cutter cuts the standing crop in relatively long lengths and delivers the material substantially lengthwise across the inclined guide and into the chopper. Thus a much finer cut is produced. The machine provides the advantages of a flail type cutter but produces a length of cut of material which a flail harvester does not obtain. By having the horizontal axis of rotation of chopper 31 extending fore-and-aft, a straight through transmission of power to the chopper is achieved. All that is then required is a right angle drive to the shaft 29 which drives the rotary cutter. Also, the ultimate discharge of material is along the left hand side of the machine facing forwardly which facilitates the discharge of material from the spout 44 to a trailing vehicle to receive the forage.

While this invention has been described in connection with a particular embodiment thereof, it will be understood that it is capable of modification, and this application is intended to cover any variations, uses, or adaptations, following, in general, the principles of the invention and including such departures from the present disclosure as come within known or customary practice in the art to which the invention pertains, and as fall within the scope of the invention or the limits of the appended claims.

Having thus described my invention, what I claim is:

1. A double cut forage harvester comprising, in combination, a wheel supported frame adapted for ground travel in a forward direction, a hood on said frame having a generally horizontally extending top wall and vertically extending walls depending therefrom, said walls defining a forwardly located inlet and a rearwardly located side discharge outlet, a rotary cutter within said hood having radially extending knife means and having a diameter traversing a major portion of said inlet, means supporting said cutter on said top wall for rotation about a vertical axis, said cutter severing a wide swath of standing crop material admitted to said hood through said inlet, said cutter subjecting the crop material to a plurality of cutting actions and discharging the cut material laterally through said side wall outlet, a housing having transversely disposed vertical side walls, a top wall and a bottom wall defining an infeed opening facing toward said hood outlet and forming a discharge opening spaced from the outlet, a reel type chopper within said housing and supported on the housing side walls for rotation about a fore-and-aft horizontal axis, a shear bar on said housing extending across said infeed opening and generally parallel to said horizontal axis, said chopper having angularly spaced knives successively cooperative with said shear bar, power means connected to said cutter and chopper, said power means including a fore-and-aft extending drive shaft to a forward axial end of said chopper and a transverse drive to said cutter, guide means carried on said frame between said hood outlet and said housing infeed opening to support and direct material discharged from said cutter to said chopper, said cutter discharging material directly to said chopper, and a spout connected to said housing in communication with said discharge opening and through which material passes that has been cut first by said cutter and then by said chopper.

2. A double cut forage harvester as recited in claim 1 wherein said guide means comprises an inclined guide plate having a lower end facing said hood discharge opening and an upper end toward said housing infeed opening.

3. A double cut forage harvester as recited in claim 2 wherein said guide plate upper end is below and spaced from said infeed opening, the guide means including also an infeed apron between the plate upper end and the infeed opening.

4. A double cut forage harvester as recited in claim 2 wherein said apron crosses the plane of rotation of said cutter knife and said guide plate is beneath said plane.

5. A double cut forage harvester as recited in claim 1 wherein said frame is supported on a pair of laterally spaced ground wheels, one of the wheels extending rearwardly of said hood and the other wheel being forwardly of said housing.

6. A double cut forage harvester as recited in claim 5 wherein said one wheel is laterally inwardly of one side of said hood and the other wheel is laterally inwardly a portion at least of said housing discharge opening.

7. A double cut forage harvester comprising, in combination, a wheel supported frame adapted for ground travel in a forward direction, a hood on said frame having a generally horizontally extending top wall and vertically extending walls depending therefrom, said walls defining a forwardly located inlet for standing crop material and a rearwardly located discharge outlet, a rotary cutter within said hood and supported on said top wall for rotation about a vertical axis, said cutter comprising one knife element at least pivotally connected to a radially extending arm for swinging movement about an axis parallel to said vertical axis and said knife cutting a swath as wide as the diameter of the cutter, a housing having vertical side walls, a top wall and a bottom wall defining an infeed opening facing toward said hood outlet and a discharge opening remote therefrom, a reel type chopper within said housing and supported on the housing side walls for rotation about a horizontal axis, a shear bar on said housing and extending across said infeed opening, said chopper having angularly spaced knives successively cooperative with said shear bar, guide means carried on said frame between said hood outlet and said housing infeed opening to direct material which is discharged directly from said cutter to said chopper, a spout connected to said housing in communication with said discharge opening and through which material passes that has been subjected to a plurality of cutting actions first by said cutter and then by said chopper, and power means connected to said cutter and chopper.

References Cited by the Examiner
UNITED STATES PATENTS

| | | | |
|---|---|---|---|
| 2,634,569 | 4/53 | Raney et al. | 56—16 |
| 2,849,851 | 9/58 | Hayter | 56—25.4 X |
| 2,946,169 | 7/60 | Soteropulos | 56—16 |
| 2,947,129 | 8/60 | Kowalik | 56—24 X |
| 2,953,887 | 9/60 | Boesch et al. | 56—23 |

ABRAHAM G. STONE, *Primary Examiner.*

ANTONIO F. GUIDA, T. GRAHAM CRAVER,
*Examiners.*